No. 632,617. Patented Sept. 5, 1899.
D. ALFVÉN.
CENTRIFUGAL MACHINE.
(Application filed Dec. 28, 1898.)
(No Model.)
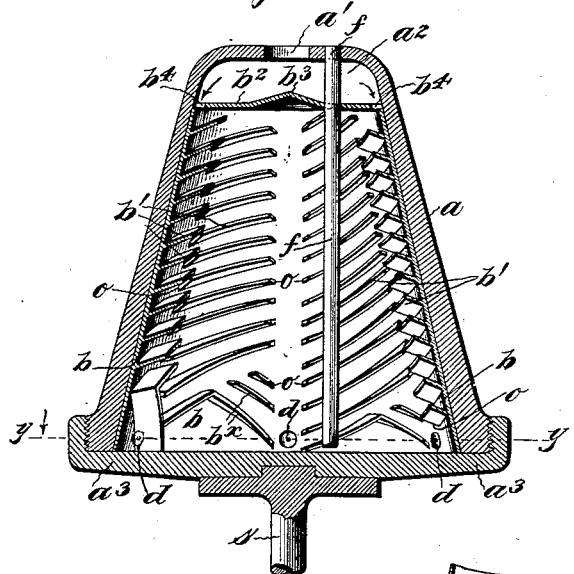
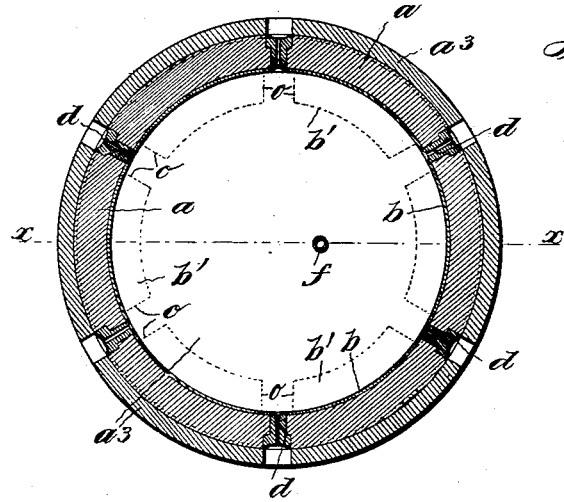
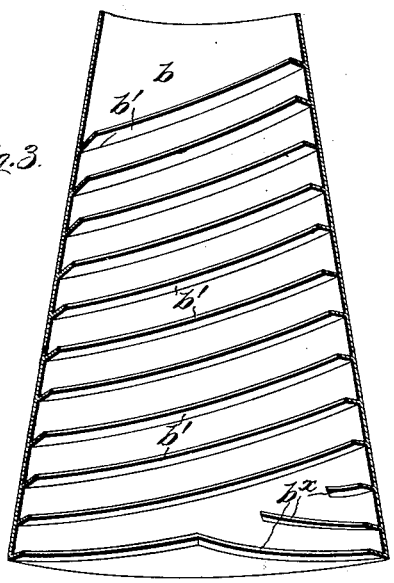
Witnesses.
Inventor.
David Alfvén,
by
Attorney

UNITED STATES PATENT OFFICE.

DAVID ALFVÉN, OF STOCKHOLM, SWEDEN, ASSIGNOR TO THE AKTIEBOLAGET SEPARATOR, OF SAME PLACE.

CENTRIFUGAL MACHINE.

SPECIFICATION forming part of Letters Patent No. 632,617, dated September 5, 1899.

Original application filed December 28, 1897, Serial No. 663,990. Divided and this application filed December 28, 1898. Serial No. 700,549. (No model.)

*To all whom it may concern:*

Be it known that I, DAVID ALFVÉN, engineer, a subject of the King of Sweden and Norway, and a resident of Stockholm, Sweden, have invented certain new and useful Improvements in Centrifugal Machines for Separating Solid Matters from Liquids; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to centrifugal separators, such as shown and described in my application for patent, Serial No. 663,990, filed December 28, 1897, of which the present application is a division.

In the separation of solid or more or less solid substances from liquids—as, for instance, in the manufacture of yeast or sugar or in the purification of oils—the separation of the solid or more or less solid constituents from the liquid constituent is materially interfered with by the tendency of said solid or more or less solid constituents to accumulate about the discharge opening or port under centrifugal action. On the other hand, the construction of separators of the kind under consideration has been such as to involve more or less difficulty, time, and labor in cleansing the same after use.

The object of my invention lies in the provision of means whereby the solid constituents separated from a liquid are divided and guided or conducted to separate discharge passages or ports. This I attain by forming upon the inner face of the separator-shell spiral ridges or ledges intersected by vertical channels, whereby superposed series of channels having a spiral trend from the upper end of the separator downwardly are formed, each of which channels opens at opposite ends into one of the vertical intersecting or intercepting channels, at the foot of each of which a discharge passage or port is provided, thus effectually preventing an accumulation of the solid or more or less solid constituents at the points of discharge, as would be the case if but a single discharge passage or port were provided. Furthermore, by forming upon the inner face of the separator a series of channels inclined in downward directions relatively to the intercepting-channels the solid or more or less solid constituents separated from the liquid constituent are distributed over the entire inner surface of such separator by centrifugal action and are gradually conducted or guided into the vertical intercepting-channels and thence to the points of discharge, so that considerable masses of such solid or more or less solid constituents cannot collect at the points of discharge, as would otherwise be the case.

In order to facilitate the cleansing of the separator, I provide a separator-shell open at one end and adapted to be contained in a housing or casing, one of the heads of which is removable, so that the separator-shell may be readily removed, and, being open at one end, ready access is had to its interior, as well as to the interior of the inclosing shell or casing.

That my invention may be fully understood I will describe the same in detail, reference being had to the accompanying drawings, in which—

Figure 1 is a vertical sectional view taken on line $x\,x$ of Fig. 2, which latter is a horizontal section on line $y\,y$ of Fig. 1 of so much of a centrifugal separator as will be necessary to a full understanding of my invention, and Fig. 3 is a detail elevation of a section of the inner frustum, showing one tier of ledges.

In practice and with a view to simplify the construction and facilitate the cleansing I construct the separator in two parts, each having the form of a frustum of a cone. The outer shell or casing $a$ is closed at its upper or smaller end and provided with an axially-arranged feed-opening $a'$, through which the material to be separated is fed in any usual manner. The lower head of the outer shell $a$—namely, the head $a^3$—at the base is detachably secured to the body of said shell—as, for instance, by providing the shell or casing with an external screw-thread about the base and the circular flange on said head $a^3$ with an internal screw-thread, as shown, said head being mounted on a vertical spindle $s$, by means of which the shell or casing $a$ is revolved. The separator-shell $b$ has also the form of a frustum of a cone that fits snugly into the outer shell or casing $a$ and is shorter than the latter to form between the smaller ends of the two a distributing-chamber $a^2$.

The separator-shell $b$ is open at its base and seats upon the removable head $a^3$ of the casing $a$, wherein it is firmly held against displacement. The separator-shell $b$ may be made of any suitable material. It may, for instance, be made of cast metal and have its tiers of ledges formed integral therewith. I prefer, however, for the sake of lightness, and consequently economy in motive power, to construct said separator-shell $b$ of sheet metal, its closed smaller end $b^2$ having an axial upwardly-projecting conical portion $b^3$ and a plurality of peripheral ports $b^4$, so that the material fed axially into chamber $a^2$ onto the cone $b^3$ will be uniformly distributed over the top $b^2$ of separator-shell $b$ to the distributing-ports $b^4$ and through the latter to the upper ledges on the inner face of said shell. As shown in Fig. 1, these ledges $b'$ are arranged spirally and are interrupted at equidistant points by a hiatus in such a manner as to form vertical intercepting-channels $o$, of which I have shown six, Fig. 2, but of course do not desire to limit myself to this number, as a greater or less number may become desirable, according to the nature of the material to be separated. By means of the described arrangement tiers of channels are formed, the opposite ends of which open into the vertical intercepting-channels $o$, at the foot of each of which is a discharge passage or port $d$, registering with a corresponding port in the outer shell or casing $a$, through which ports the solid or more or less solid constituents separated from a liquid by centrifugal action are expelled by said action and collected in any well-known manner. The liquid under centrifugal action rises through a pipe $f$, that extends nearly to the lower head $a^3$ of the separator-casing $a$ and out through its upper head, such pipe discharging in a well-known manner into a receptacle encircling the shell or casing $a$. (Not shown.)

In order to prevent undue accumulation of solid or more or less solid material at points where the ledges, and consequently the channels formed between them, would terminate above the lower head $a^3$ of the outer shell or casing $a$, hence not in direct communication at those points with one of the vertical intercepting-channels, I provide intercepting-channels formed by ledges $b^\times$, that conduct such solid or more or less solid matter to one or the other of the aforementioned vertical intercepting-channels $o$, as more clearly shown in Fig. 3.

From the description of the construction of the separator it will readily be seen that the objects of the invention set forth hereinabove are attained.

Having thus described my invention, what I claim as new therein, and desire to secure by Letters Patent, is—

1. A centrifugal separator revoluble about its vertical axis and provided with ledges arranged spirally about its inner surface, the continuity of said ledges being interrupted at different points of the said inner surface to form vertical clear passages and divide the ledges into tiers of superposed channels whose opposite ends merge into said vertical passages, and a discharge-port at the foot of each of said vertical passages, for the purpose set forth.

2. A centrifugal separator comprising two hollow frusta of cones open at their bases and fitting snugly into each other, a head removably secured to the open end of the outer frustum on which head the inner frustum is seated, a vertical revoluble spindle on which said head is mounted, means for feeding the materials to be separated to the inner frustum at its upper or narrower end, and means for discharging therefrom the materials separated therein, for the purpose set forth.

3. A centrifugal separator comprising two hollow frusta of cones open at their bases and fitting snugly into each other, the inner frustum shorter than the outer one and provided with a distributing port or ports in its upper head, a head removably secured to the open base of the outer frustum on which head the open end of the inner frustum is seated, a vertical revoluble spindle on which said head is mounted, means for feeding the materials to be separated to the chamber formed between the upper heads of the frusta, and means for discharging the materials separated in the inner frustum, for the purpose set forth.

4. A centrifugal separator comprising two interfitting frusta of cones, the inner one shorter than the outer one, both cones open at their bases, said inner frustum provided with tiers of ledges projecting from its inner face so as to leave a clear vertical passage between each two tiers, said ledges inclined relatively to said vertical passages, distributing-ports in the upper head of said inner frustum disposed to discharge upon the upper ledge of each tier of such, a head removably secured to the open end of the outer frustum and on which head the inner frustum is seated, a vertical revoluble spindle on which said head is mounted, discharge-ports at the foot of the aforementioned vertical passages between the tiers of ledges on the inner frustum, corresponding ports in the outer frustum, means for educting the liquid constituent of the materials separated in the inner frustum, and means for feeding the materials to be separated to the distributing-chamber formed between the heads of the two frusta, substantially as and for the purpose set forth.

In testimony that I claim the foregoing as my invention I have signed my name in presence of two subscribing witnesses.

DAVID ALFVÉN.

Witnesses:
   CARL P. GERELL,
   TH. WAWRINSKY.